United States Patent

Post et al.

[15] 3,666,828
[45] May 30, 1972

[54] CONDENSATE PURIFICATION AND RECOVERY FOR USE AS DILUTION STEAM TO PYROLYSIS FURNACE

[72] Inventors: Carl A. Post; Eldred J. Cabanaw, both of Bartlesville, Okla.

[73] Assignee: Phillips Petroleum Company

[22] Filed: Sept. 14, 1970

[21] Appl. No.: 71,786

[52] U.S. Cl. ..........................260/683 R, 196/132, 208/47, 208/48 AA, 208/130, 208/187
[51] Int. Cl. .................C07c 3/30, C10g 9/36, C10g 33/00
[58] Field of Search ................260/683; 208/130, 187, 47, 208/48; 196/132

[56] References Cited

UNITED STATES PATENTS

| | | | |
|---|---|---|---|
| 2,001,444 | 5/1935 | Zotos | 208/130 |
| 1,956,573 | 5/1934 | Haslam | 208/130 |
| 2,786,802 | 3/1957 | Hanisian et al. | 208/187 |

FOREIGN PATENTS OR APPLICATIONS

| 1,436,275 | 3/1966 | France | 260/683 |
|---|---|---|---|

Primary Examiner—Delbert E. Gantz
Assistant Examiner—C. E. Spresser
Attorney—Young and Quigg

[57] ABSTRACT

A condensate purification and recovery method and apparatus for purifying water from the pyrolysis tower of a naphtha cracking unit which involves settling the water and separating the oil and producing dilution steam and oil, both of which are returned to the cracking unit.

9 Claims, 1 Drawing Figure

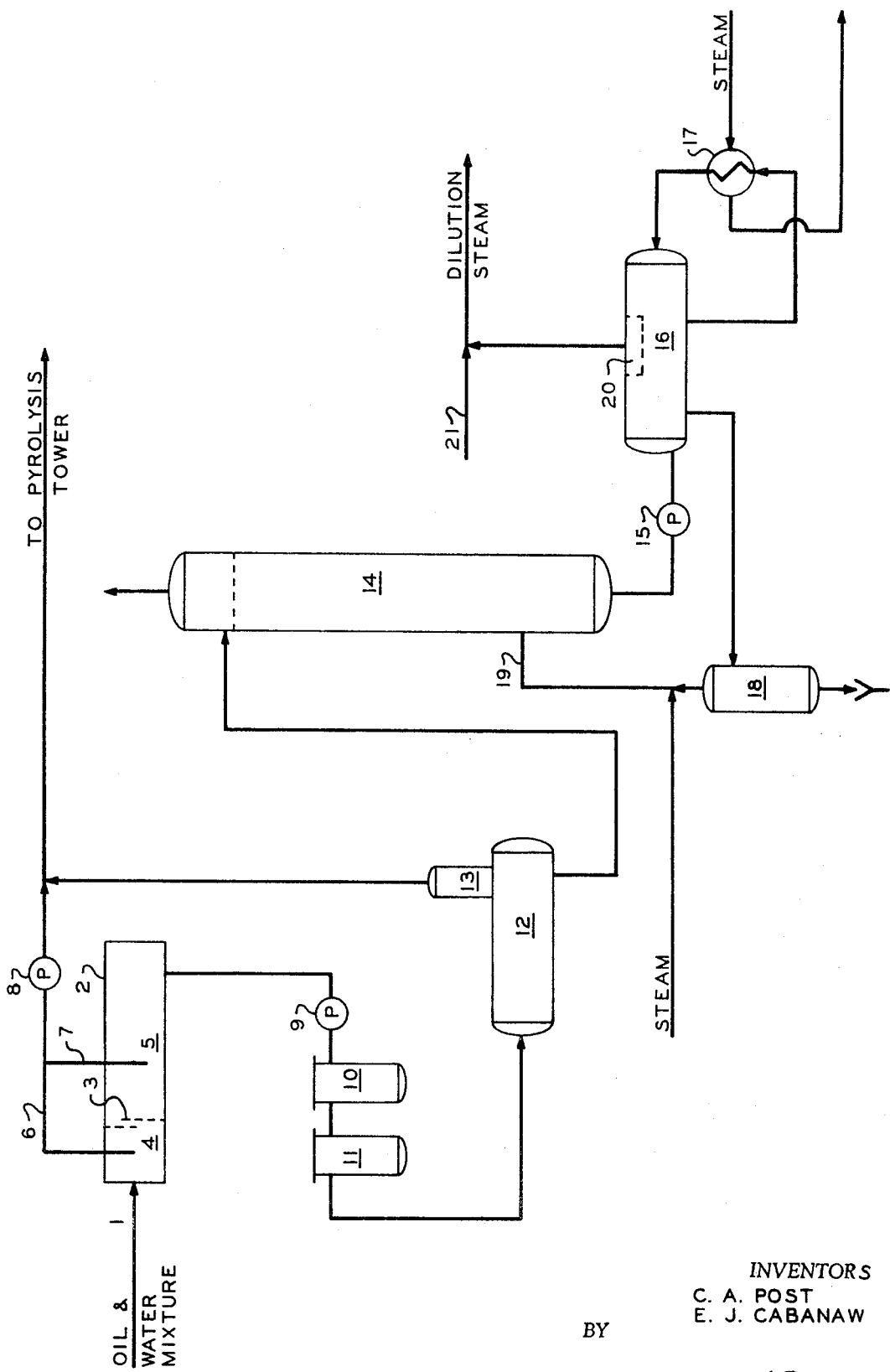

3,666,828

CONDENSATE PURIFICATION AND RECOVERY FOR USE AS DILUTION STEAM TO PYROLYSIS FURNACE

This invention relates to condensate purification and recovery.

In one of its more specific aspects, this invention relates to the reclamation of naphtha cracker steam recovery.

Modern technological developments have enabled the construction of larger petrochemical units than have been previously constructed. For example, construction of naphtha cracking units which produce about 450,000 tons per year of ethylene is now possible. Attendant therewith, however, is the problem of waste product disposal. For example, a naphtha cracker which produces 300,000 tons per year of ethylene will also produce about 120,000 pounds per hour of contaminated condensate. The disposal of such condensate presents not only an ecological problem but also an economic problem as related not only to the cost of replacing this amount of water but also related to the amount of recoverable heat which it contains.

The present invention is directed towards the avoidance of these problems by providing both a method and an apparatus for the purification and recovery of naphtha cracker steam condensate in such a manner as to permit its recirculation to the naphtha cracking furnace as dilution steam.

According to this invention there is provided a method of recovering condensate for use as dilution steam to pyrolysis furnaces which comprises settling the oil-water mixture for a period sufficient to separate a portion of the oil from the water. The water is then filtered and coalesced to separate a second portion of oil from the water and also to remove the fine coke which is suspended in the water. The water is then flash-vaporized to separate a third oil stream and inerts, and to produce steam. The separated oil streams and the steam are returned to the cracking unit.

Also according to the method of this invention there is provided apparatus for recovering condensate for use as dilution steam to pyrolysis furnaces which comprises a settling tank, skimming means for removing oil from the settling tank, at least one filter into which the water from the settling tank discharges, a coalescer adapted to receive the water discharged from the filter, the coalescer being adapted to separate an oil stream and to discharge a water stream into a stripper. The stripper discharges through a reboiler from which a steam and water stream are discharged into a steam generator. The steam generator has an overhead conduit through which steam is discharged and conduit through which water is discharged into the stripper. A steam line also opens into the stripper with an overhead conduit being provided from the stripper to remove oil and inerts.

The present invention will be more easily understood when explained in conjunction with the attached drawing which depicts the best mode for carrying out the invention.

Referring now to the attached drawing, water at about 210° F. from the pyrolysis tower oil water separator enters a multisectional oil-water separator 2 through conduit 1. This water can already have had its oil content reduced such that in the water there is contained only about 300 ppm oil.

A settling time of about 10 minutes and a residence time of about 30 minutes is provided in the oil-water separator which is divided by weir 3 into the two compartments, 4 and 5. Sufficient settling time and quiesence are supplied in the separator such that adjustable swing lines 6 and 7 can be employed in each compartment to provide withdrawal of supernatent hydrocarbon from the compartments. This hydrocarbon is discharged to the pyrolysis tower through pump 8.

After sufficient settling time to affect substantial separation between the hydrocarbons and the water, water is withdrawn from the lowermost compartment and discharged from pump 9 through one or more strainers 10 and 11.

These strainers can be basket type strainers and can be positioned for series or alternate operation. For series flow in which they will be generally operated, the first of these strainers can be equipped with a coarse mesh screen and the second of the strainers can be equipped with a fine mesh screen such that coke having a particle size as small as ⅛-inch will be retained by the first strainer and coke having a particle size as small as 1/16-inch will be retained by the second strainer.

The effluent stream from the strainers passes into coalescer 12. This coalescer can be of the bag-type and is provided with a separation section 13 from which any separated hydrocarbon is discharged to the pyrolysis tower.

From the bottom of the coalescer, water containing some residual oil is discharged into steam stripper 14. This steam stripper is of the tray-type and operates at a pressure of within the range of about 10 to about 45 psig and at a temperature of about 290° F. The water from the coalescer is introduced into the stripper on or near its top tray.

Water from the bottom of the stripper is circulated by pump 15 into dilution steam generator 16.

This dilution steam generator acts as a separation zone and operates at a pressure of about 130 psig and at a temperature of about 365° F. Heat is supplied to the vessel by means of a thermosyphon reboiler, the water being withdrawn from the bottom of the generator and entering reboiler 17. Steam at about 250 psig is passed in heat exchanger with the water passing through the reboiler such that a mixture of steam and water is generated and introduced into the generator. One hundred thirty (130) psig steam is separated in the generator and passes from the drum, preferably through demister 20 positioned in the steam outlet. Water, in equilibrium with the steam, is withdrawn from the drum and is routed into flash pot 18. This water flashes from the pot to the stripper, sufficient 45 psig steam being added to maintain the steam stripper operating conditions previously recited. As a result, there passes overhead from the steam stripper some steam, quantities of hydrocarbons, and noncondensibles such as carbon dioxide, carbon monoxide, nitrogen and the like. Water discharges out the bottom of pot 18 to the drain.

Noncondensibles are present in the water in sufficient amounts to advisedly inject an anticorrosion agent to reduce corrosion attendant to the operation of the dilution steam generator. Similarly, an antifoaming agent can be injected to minimize liquid carry-over in the steam from the drum. For these purposes, both the anticorrosion agent and the antifoaming agent are advantageously introduced into the water at various points of the system.

The above-described system can be readily controlled by a system comprised of conventional control apparatus. The rate of water introduced to the oil-water separator can be controlled by a flow controller positioned in the inlet line to the oil-water separator responsive to a level controller on the pyrolysis tower. The rate at which water is withdrawn from the oil-water separator and introduced into the steam stripper can be controlled by a flow controller positioned in the inlet line to the steam stripper from the coalescer and responsive to a liquid level controller associated with the oil-water separator. The rate at which water is introduced into the dilution steam generator can be controlled by a liquid level control valve positioned in the water line between the steam stripper and the dilution steam generator and responsive to a liquid level controller which regulates the height of the liquid level maintained in the steam stripper.

The rate of steam introduction to the reboiler can be controlled by a liquid level control valve positioned in the steam condensate line from the reboiler and responsive to a liquid level controller which controls the liquid level within the dilution steam generator. The dilution steam pressure can be maintained by a letdown valve in line 21 from a higher pressure steam system (250 psig). This will maintain steam available as dilution steam regardless of the demand or the amount of condensate being circulated. A pressure control valve positioned in the overhead line from the steam stripper and responsive to the pressure maintained in the stripper can control the rate at which overhead is vented from the steam stripper. Other controls can be supplied as a matter of convenience though the above system will generally be sufficient.

In a specific application of the above system, about 120,000 pounds per hour of pyrolysis tower water from an oil-water separator were introduced into the oil-water separator. This water contained about 300 ppm oil.

This water was maintained in the separator at a temperature of about 210° F. for 10 minutes, being allowed to stand under settling conditions for an additional 30 minutes. From the separator, approximately 120,000 pounds per hour of water, containing about 200 ppm oil, were transferred through two basket strainers and into a coalescer. About 100 ppm of oil were skimmed from the surface of the separator and returned to the pyrolysis tower.

Water from the coalescer was introduced into the steam stripper at the rate of about 115,000 pounds per hour, introduction being made on the top tray of the tower which contained about 10 trays. The overhead from the coalescer which was returned to the pyrolysis tower amounted to about 4–8 gallons per hour. Water was circulated through the reboiler at the rate of 960,000 pounds per hour. Blowdown from the dilution steam generator to the flash pot was at a rate of 12,000 pounds per hour and at a temperature of about 365° F. About 10,000 pounds per hour of 45 psig steam were introduced into the steam stripper.

A stream comprising nitrogen, carbon monoxide, oxygen, carbon dioxide and hydrocarbons was taken overhead from the steam stripper. Dilution steam saturated at a pressure of 130 psig was withdrawn from the dilution steam generator at the rate of 115,000 pounds per hour. It contained oil in the amount of less than 1 ppm.

It will be evident from the foregoing that various modifications can be made to the method of this invention. Such, however, are considered as being within the scope of the invention.

What is claimed is:

1. A method of recovering condensate from a cracking unit, said condensate comprising an oil and water mixture which comprises:
   a. settling said oil and water mixture for a period sufficient to separate a layer of oil on said water;
   b. separating said layer of oil from said water;
   c. filtering said water to remove solids;
   d. coalescing a portion of the remaining oil in said filtered water and separating oil from said coalesced water;
   e. introducing said coalesced water and steam into a stripping tower;
   f. separating remaining oil and inerts from said water in said stripping tower;
   g. circulating water from said stripping tower through a reboiler to produce a mixture comprising steam and water;
   h. introducing said mixture comprising steam and water into a separation zone;
   i. withdrawing steam from said separation zone; and,
   j. withdrawing water from said separation zone and introducing said water into said stripping tower.

2. The method of claim 1 in which said separated oil and said steam are reintroduced into said cracking unit.

3. The method of claim 2 in which said water circulated from said stripping tower to said reboiler is circulated through said separation zone.

4. The method of claim 3 in which said water is filtered twice.

5. The method of claim 4 in which an antifoam agent and an anticorrosion agent are introduced into said water circulated from said stripping tower.

6. Apparatus for the recovery of condensate from a cracking unit, said condensate comprising an oil and water mixture which comprises:
   a. a settling tank adapted to receive said mixture and to stratify said oil therein;
   b. oil removal means adapted to remove said stratified oil from said settling tank;
   c. at least one filter adapted to receive water from said settling tank;
   d. a coalescer in open communication with said filter, said coalescer being adapted for separation of an oil stream and a stream comprising water therefrom;
   e. a stripper adapted for the introduction of steam and said water from said coalescer and for the removal of oil therefrom;
   f. circulation means for circulating water from said stripper through an after-defined separation zone and an after-defined heating means;
   g. heating means adapted to receive water from said after-defined separation zone and to discharge a steam-water mixture to said separation zone; and,
   h. a separation zone adapted to receive said steam-water mixture and to separate a stream comprising steam and to discharge water to said stripper.

7. The apparatus defined in claim 6 in which said circulation means comprises a pump and said heating means comprises a thermosyphon reboiler.

8. The apparatus defined in claim 7 in which said stripper comprises a separation tower containing trays.

9. The apparatus defined in claim 8 in which a demister is positioned within said separation zone.

* * * * *